UNITED STATES PATENT OFFICE.

PHILIP FINKELSTEIN, OF NEW YORK, N. Y.

DYE.

SPECIFICATION forming part of Letters Patent No. 542,046, dated July 2, 1895.

Application filed April 4, 1895. Serial No. 544,472. (No specimens.)

*To all whom it may concern:*

Be it known that I, PHILIP FINKELSTEIN, a citizen of the United States, residing at the city of New York, county and State of New York, have invented certain new and useful Improvements in Dyes, of which the following is such a full, clear, and exact description as will enable any one skilled in the art to which it appertains to make and use the same.

My invention relates to a mixture or solution for dyeing textile or other materials and it has reference more especially to dyeing by the use of aniline-black.

I have discovered that by admixing with aniline-black sulphuric acid, Glauber's salts, and pepsin, with or without the addition of soda or ammonia, and properly diluting the mixture with water, fine fast colors may be obtained.

I have succeeded in obtaining excellent results by using the following proportions of ingredients composing the mixture: one and one-half ounces of aniline-black; one-half ounce of sulphuric acid; one-half ounce of what is commonly called "Glauber's salts;" one-sixteenth ounce of pepsin, and one-sixteenth ounce of soda or ammonia. If preferred, the soda or ammonia may be wholly omitted, though it is desirable to use either one or the other of these ingredients. This dyeing mixture in the above-named proportions is diluted with about a pint of water and this will readily serve to dye a single garment, such as an ordinary coat, a jet black color, which will be found to be fast and uniform in appearance without streaks or stains.

In preparing the mixture I find that without the pepsin the admixture of the other ingredients solidifies and that the pepsin acts as a solvent for the same when added.

When dyeing in a vessel containing rust it often happens that the rust causes stains to be produced upon the dyed article. This I find to be wholly obviated by the use of Glauber's salts in my solution.

By diluting the bath sufficiently the goods may be dyed blue and by making the bath still weaker a grayish color may be obtained by the use of the above-described mixture. I prepare this dye in the above-specified proportions and put it up in pint bottles for the trade, one such bottle being sufficient to dye an ordinary garment. When so put up for the trade I call it "French blue-black."

Having thus described my invention, what I claim, and desire to secure by Letters Patent, is—

1. A dye composed of an admixture of aniline black, sulphuric acid, Glauber's salts, pepsin, and soda or ammonia.

2. A dye composed of an admixture of aniline black, sulphuric acid, Glauber's salts and pepsin.

In testimony whereof I have hereunto set my hand, this 3d day of April, 1895, in the presence of the two subscribing witnesses.

PHILIP FINKELSTEIN.

Witnesses:
   A. M. FRUMBERE,
   WILLIS FOWLER.